(12) United States Patent
Herud (10) Patent No.: US 11,577,326 B2
(45) Date of Patent: Feb. 14, 2023

(54) SEALING PISTON FOR A HYDRAULIC EXPANSION CHUCKING DEVICE AND EXPANSION CHUCKING DEVICE

(71) Applicant: Kennametal Inc., Latrobe, PA (US)

(72) Inventor: Josef K. Herud, Herzogenaurach (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/910,675

(22) Filed: Jun. 24, 2020

(65) Prior Publication Data

US 2020/0406370 A1 Dec. 31, 2020

(30) Foreign Application Priority Data

Jun. 25, 2019 (DE) .......................... 102019209167.9

(51) Int. Cl.
*F16J 1/00* (2006.01)
*B23B 31/30* (2006.01)
*F16J 15/3224* (2016.01)

(52) U.S. Cl.
CPC ......... *B23B 31/305* (2013.01); *F16J 15/3224* (2013.01); *F16J 1/008* (2013.01)

(58) Field of Classification Search
CPC ............... B23B 31/305; B23B 31/1172; B23B 31/1178; B23B 31/1176; F16J 15/3224;

(Continued)

(56) References Cited

U.S. PATENT DOCUMENTS 3,182,568 A 5/1965 Davis
3,250,542 A 5/1966 Winnen et al.
(Continued)

FOREIGN PATENT DOCUMENTS

DE 95156 1/1973
DE 29921941 3/2000
(Continued)

OTHER PUBLICATIONS

Machine Translation, KR 2010-0004515 U. (Year: 2010).*
Machine Translation, DE 102010008872 A1. (Year: 2010).*
Feb. 28, 2020 Foreign OA P19-06381-DE-NP.

*Primary Examiner* — Chwen-Wei Su
(74) *Attorney, Agent, or Firm* — Christopher J. Owens (57) ABSTRACT

The invention relates to a sealing piston, which is designed for use in a hydraulic expansion chucking device. The sealing piston comprises a pin that extends in an axial direction (A), and a seal that adjoins the pin and likewise extends in said axial direction (A). The seal comprises a sealing shaft that adjoins the pin and has a shaft radius (Rs). The seal further comprises a sealing head that adjoins the sealing shaft, wherein the sealing head comprises a circumferential sealing lip, which has a sealing radius (Rd) that is greater than the shaft radius (Rs). The sealing lip forms a contact surface in radial direction (R) for abutment and sealing against an inner wall of a bore in the expansion chucking device, and, measured in axial direction (A), has a sealing length (Ld) that is greater than the difference between the sealing radius (Rd) and the shaft radius (Rs). The invention further relates to a corresponding expansion chucking device.

9 Claims, 3 Drawing Sheets

(58) Field of Classification Search
CPC ...... F16J 1/008; F16J 1/00; F16J 1/001; F16J 1/003; F16J 1/005; F16J 1/006; F16J 9/12; F16J 9/20; Y10T 279/1283; Y10T 279/1241; Y10T 279/1216
See application file for complete search history.

(56) References Cited

U.S. PATENT DOCUMENTS

| | | | | |
|---|---|---|---|---|
| 4,317,577 | A * | 3/1982 | Cameron | B23B 31/305 |
| | | | | 242/571.2 |
| 5,398,945 | A | 3/1995 | Hinshaw et al. | |
| 7,913,881 | B2 * | 3/2011 | Herman | F16J 1/06 |
| | | | | 92/204 |
| 2005/0184472 | A1 * | 8/2005 | Huijbers | B23B 31/305 |
| | | | | 279/4.01 |
| 2007/0138751 | A1 | 6/2007 | Iguchi | |
| 2016/0033042 | A1 * | 2/2016 | Minagawa | F16J 15/102 |
| | | | | 427/508 |
| 2017/0138913 | A1 | 5/2017 | Nocon et al. | |
| 2018/0245648 | A1 * | 8/2018 | Hashimoto | F16D 65/183 |

FOREIGN PATENT DOCUMENTS

| | | | | |
|---|---|---|---|---|
| DE | 102004055599 A1 * | 5/2006 | ............. | B29C 45/53 |
| DE | 102010008872 A1 * | 8/2011 | ........... | B23B 31/261 |
| DE | 102016002947 | 9/2017 | | |
| DE | 102017002144 | 9/2017 | | |
| EP | 0212047 | 3/1987 | | |
| EP | 1882537 | 1/2008 | | |
| EP | 1737594 B1 | 3/2010 | | |
| KR | 20100004515 U * | 5/2010 | ........... | B23B 31/305 |
| WO | WO-9846896 A1 * | 10/1998 | ........... | B23B 31/305 |
| WO | WO-2009128265 A1 * | 10/2009 | ........ | A61M 5/31513 |
| WO | WO2018210374 | 11/2018 | | |

* cited by examiner

SEALING PISTON FOR A HYDRAULIC EXPANSION CHUCKING DEVICE AND EXPANSION CHUCKING DEVICE

RELATED APPLICATION DATA

The present application claims priority pursuant to 35 U.S.C. § 119(a) to German Patent Application Number 102019209167.9 filed Jun. 25, 2019, which is incorporated herein by reference in its entirety.

FIELD

The invention relates to a sealing piston for a hydraulic expansion chucking device and such an expansion chucking device.

BACKGROUND

A hydraulic expansion chucking device holds a tool or a workpiece by means of hydraulic pressure. One example of an expansion chucking device is an expansion chuck. For clamping or unclamping the tool or workpiece, the expansion chucking device comprises an expansion sleeve having a wall and a pressure chamber, in which a fluid is contained. The pressure chamber can be accessed via a bore in the expansion chucking device. A sealing piston is inserted into this bore, by means of which pressure is exerted on the fluid and thus on the wall. The pressure, and consequently also the clamping of the tool or the workpiece in or on the expansion sleeve, can be adjusted by moving the sealing piston in the bore, e.g. by screwing it in or out. Accordingly, more or less pressure is exerted.

EP 1 737 594 B1 and DE 10 2017 002 144 A1 include examples of hydraulic expansion chucks and the associated sealing pistons.

The tightness of the sealing piston inside the bore of the expansion chucking device is of key importance to its optimum operation. Leakage of the fluid out of the pressure chamber should be avoided as much as possible. But, since the sealing piston has to be movable, a seal is difficult to achieve; especially since the repetitive movement of the sealing piston when clamping and unclamping a tool or workpiece causes the sealing piston to wear out over time, as a result of which the sealing effect decreases.

SUMMARY

With this in mind, one object of the invention is to provide an improved sealing piston for use in a hydraulic expansion chucking device. The sealing piston should ensure the greatest possible tightness for as long as possible. A corresponding expansion chucking device having such a sealing piston is to be provided as well.

According to the invention, the object is achieved by a sealing piston and by an expansion chucking device having the features according to the independent claims. Advantageous configurations, further developments, and variants are the subject matter of the subclaims. The explanations relating to the sealing piston apply analogously to the expansion chucking device and vice versa.

In essence, a sealing piston according to the invention is in particular characterized by the fact that it comprises a sealing lip that is overall blunt and, when viewed in axial direction, long. This concept will be described in more detail in the following.

The sealing piston is designed for use in a hydraulic expansion chucking device. The expansion chucking device comprises a bore into which, when used as intended, the sealing piston is inserted. The sealing piston seals a pressure chamber of the expansion chucking device from the environment. The sealing piston can be moved in the bore, as a result of which, depending on the direction, the expansion chucking device can be clamped and released. A fluid is disposed in the pressure chamber, which in turn presses on a wall, e.g. an expansion sleeve, in which a tool or workpiece can be clamped. The fluid is an oil, for example. By moving the sealing piston into or out of the bore, pressure is correspondingly exerted on the fluid and the wall, as well as on a tool or workpiece clamped therein or thereon.

In the present case, without loss of generality, it is assumed that the expansion chucking device is an expansion chuck comprising an in particular cylindrical expansion sleeve, which surrounds a cavity into which a tool or workpiece can be inserted and in which the tool or workpiece can be clamped by actuating the sealing piston.

The sealing piston comprises a pin, which extends in an axial direction. The sealing piston further comprises a seal that adjoins the pin and likewise extends in said axial direction. In other words: the pin and the seal extend along a common longitudinal axis and are arranged concentrically and one behind the other with respect to said longitudinal axis. The longitudinal axis extends in axial direction. Perpendicular to the axial direction is a radial direction. The seal follows the pin in particular directly in axial direction. The pin is used to actuate the sealing piston from the outside. The seal, on the other hand, faces the inside of the expansion chucking device and is in particular in contact with the fluid in the pressure chamber. For this reason, the pin is also referred to as the upper or outer part of the sealing piston, whereas the seal is referred to as the lower or inner part of the sealing piston.

The seal comprises a sealing shaft that adjoins the pin and has a shaft radius. The shaft radius is measured in radial direction, i.e. perpendicular to the longitudinal axis. The shaft radius preferably corresponds to a pin radius of the pin or an inner radius of the bore, or both. The seal further comprises a sealing head that adjoins the sealing shaft. The sealing head in particular adjoins the sealing shaft directly, i.e. without additional sections in between. The sealing shaft is primarily used in particular to guide the seal in the bore, and is therefore preferably manufactured with play relative to the bore.

The sealing head comprises an in particular completely circumferential sealing lip, which has a sealing radius that is greater than the shaft radius. The sealing radius is also measured in radial direction, i.e. perpendicular to the longitudinal axis. The sealing lip forms a contact surface in radial direction for abutment and sealing against an inner wall of a bore in the expansion chucking device. In other words: the sealing radius is larger than an inner radius of the bore, i.e. it is manufactured oversized with respect to the bore, so that an interference fit is produced and the sealing lip in the inserted state rests against the inner wall of the bore in a sealing manner. The sealing lip is thus the part of the sealing head which, when inserted, is in contact with the inner wall of the bore and compressed, in particular in radial direction, so that a sealing effect is achieved. The actual sealing effect of the sealing piston as a whole is therefore in particular realized exclusively by the sealing head and specifically predominantly or exclusively by the sealing lip. The contact surface of the sealing lip also essentially determines the overall outer contour of the sealing head, whereby the outer contour should be viewed in cross-section along the longitudinal axis and delimits the sealing head in radial direction.

Measured in axial direction, the sealing lip has a sealing length that is greater than the difference between the sealing radius and the shaft radius. The difference is also referred to as the overhang or the sealing thickness. The sealing length is preferably at least 1.5 times, particularly preferably at least twice the difference between the sealing radius and the shaft radius. In principle, the sealing length to the top is limited only by the length of the sealing head as a whole and, in a suitable design, is at most 5 times the difference between the sealing radius and the shaft radius.

The sealing piston as a whole preferably has only a single sealing lip.

Due to the specific sealing length, the sealing lip has an overall elongated, i.e. long, and also blunt shape, unlike the comparatively pointed sealing lips in Documents EP 1 737 594 B1 and DE 10 2017 002 144 A1 mentioned above. The sealing lip specifically shaped and dimensioned according to the invention has a variety of advantages. For one, the sealing lip itself is particularly solid, especially in contrast to a pointed and therefore flat and thin sealing lip, and is therefore particularly well protected against accidental damage when being inserted into the bore of the expansion chucking device. Such damage would otherwise result in a leaky expansion chucking device and, right from the start, in leakage, i.e. an unwanted escape of fluid from the pressure chamber. In addition, a particularly large contact surface is realized, as a result of which the overall sealing effect is improved. Particularly when entering the bore, a high force acts on the sealing head and the sealing lip. The stronger and more solid the sealing lip, the better it can withstand a corresponding pressure build-up. Leakage of fluid is reduced or completely prevented by the special sealing lip. The sealing piston is furthermore particularly resistant to repeated movement and loading and therefore wears out particularly slowly. As a result, a tool or workpiece remains particularly reliably clamped and held securely in or on the expansion chucking device, even over long periods of time.

The pin suitably consists of a rigid material, preferably a metal, in particular steel. The pin is in particular rotationally symmetric with respect to the longitudinal axis. Expediently, the pin is a cylinder. The pin is preferably manufactured in one piece, i.e. monolithic. The pin can expediently be moved by means of an additional actuator that is inserted into the bore, in particular concentrically to the sealing piston, and acts along the longitudinal axis on a surface of the pin; i.e. on a side of the pin facing away from the seal. The actuator is a screw, for example, and the bore of the expansion chucking device comprises a suitable thread for guiding the screw.

The seal preferably consists of an elastic material, in particular a plastic, so that the seal adapts optimally to the bore and thereby seals the pressure chamber. In a suitable design, the seal consists of a thermoplastic polyurethane—abbreviated as TPU. Expediently, the material generally has the best possible chemical resistance, especially to the fluid in the pressure chamber, as well as the best possible wear resistance, temperature resistance, formability with regard to manufacturing, elasticity with regard to insertion into the bore, service life and sealing effect, and also friction properties, especially relative to the inner wall of the bore. The pin is in particular rotationally symmetric with respect to the longitudinal axis. The seal is preferably manufactured in one piece, i.e. monolithic. The seal is preferably produced using an injection molding process and is in particular rotationally symmetric.

In a particularly preferred design, the sealing lip is at least 1 mm long measured in axial direction, i.e. has a sealing length of at least 1 mm. The sealing lip is expediently no more than 2 mm long; particularly preferably the sealing lip is at least 1 mm and no more than 1.3 mm long. These lengths produce an overall long and blunt sealing lip with an advantageous sealing effect.

In a merely exemplary but suitable design for a bore having an inner radius of 6 mm plus an upward tolerance, the pin is undersized, e.g. has a diameter of 5.9 mm, the sealing shaft has a shaft radius of 3 mm and the sealing lip has a sealing radius of 3.3 mm, i.e. is generally oversized with respect to the bore. Overall, the seal is approximately as long as it is wide, e.g. 6 mm long, whereby the sealing shaft has a shaft length between 2 mm and 3 mm and the sealing head is accordingly between 3 mm and 4 mm long. The sealing lip has a sealing length between 1 mm and 1.3 mm. The sealing lip is preferably formed approximately midway along the sealing head. For bores having other inner radii, the dimensions are correspondingly different. Exemplary and at the same time advantageous designs result in particular from scaling the values mentioned for the 6 mm bore or carrying the ratios thereof over to other inner radii.

The contact surface generally extends around the longitudinal axis in an in particular annular manner. The sealing lip is accordingly configured in particular as a disc-shaped longitudinal section of the sealing head and protrudes in radial direction relative to the rest of the sealing head and especially also relative to the sealing shaft. The sealing lip is in particular located in a plane perpendicular to the longitudinal axis. A variety of designs are suitable for the sealing lip and especially for the outer contour, which is determined by the course of the contact surface, as long as the overall result is a correspondingly long and blunt shape.

In a first suitable design, the sealing lip is cylindrical so that the contact surface is straight and extends in axial direction, i.e. parallel to the longitudinal axis. The sealing lip is thus parallel to the inner wall of the bore.

In a second suitable design, the sealing lip is in particular convex, i.e. in particular spherical and curved outward. Overall, the sealing lip is also in particular free of edges. In a sectional view along the longitudinal axis, the sealing lip has a corresponding radius of curvature, which in a preferred design is at least 1 mm. In the edge case of an infinitely large radius of curvature, the result is in particular the straight design mentioned above.

In principle, a design is possible and suitable in which the sealing lip alone forms the entire sealing head, so that the seal consists solely of the sealing shaft and the sealing lip attached to it. On the other hand, in one variant, the sealing head expediently comprises one or more further longitudinal sections, as will be explained in more detail in the following.

In a suitable design, the sealing head comprises a connecting section that connects the sealing shaft with the sealing lip, whereby the radius of the sealing head continuously widens along the connecting section from the shaft radius to the sealing radius. The connecting section is thus a widening section that is configured such that the radius of the seal is continuously widened from the sealing shaft and along the longitudinal axis to the sealing lip. An edge, which is preferably rounded, may possibly result at the transition from the connecting section to the sealing lip; in particular in the case of a straight sealing lip. In a particularly preferred design, the connecting section is frustoconical, so that the radius constantly widens in axial direction. Overall, the widening section stabilizes the sealing lip in an advantageous manner and, so to speak, supports it as it enters the bore, so that the sealing lip is prevented from folding upward; i.e. in the direction of the sealing shaft. Because of the connecting section, there is a continuous transition from the sealing shaft to the sealing lip, as a result of which the latter acts more like a thickening of the sealing head and specifically not like a step attached to it. Measured in axial direction, the connecting section has a length that preferably corresponds to at least 75% and at most 150% of the sealing length of the sealing lip.

Additionally or alternatively, in a suitable design, the sealing head comprises an end section which adjoins the sealing lip on the side of the sealing lip that is opposite to the sealing shaft. In the case of an additional connecting section, the sealing lip is then quasi framed by said connecting section and the end section in axial direction and sandwiched between them. The radius of the sealing head continuously decreases along the end section from the sealing radius to an end radius. The end section in particular forms one end of the sealing head, and also of the entire sealing piston. On its end, the end section comprises a circumferential edge which forms a transition to a front surface of the sealing head. The circumferential edge is preferably rounded and, in a suitable design, therefore has a radius of curvature between 0.5 mm and 1 mm. The end section is preferably frustoconical and oriented such that the radius tapers constantly in axial direction and toward the front surface. The end radius is preferably at least 90% and at most 100% of the shaft radius. Measured in axial direction, the end section has a length that preferably corresponds to at least 75% and at most 150% of the sealing length of the sealing lip. The length of the end section in particular corresponds approximately to the length of the connecting section.

In contrast to the abovementioned design of the end section, it is conceivable and likewise suitable for it to be designed such that it does not taper toward the front surface but is instead oriented conversely, such that the radius is constant or widens from the sealing lip toward the front surface. The dimensions mentioned above can advantageously be carried over. A step at which the end section is set back inward relative to the sealing lip is then formed below the sealing lip, so that the radius is reduced abruptly and discontinuously, e.g. to the shaft radius. Based on this, the radius either remains constant or widens toward the bottom, i.e. toward the front surface and away from the sealing lip, to the end radius, but does not exceed the sealing radius. In this design with a conversely tapered end section, a particularly large area faces the pressure chamber, which is advantageous in particular with regard to the pressure acting on the sealing head.

Particularly preferred is a design in which a connecting section is combined with an end section, whereby the radius respectively widens toward the sealing lip; i.e. respectively tapers away from the sealing lip. Expediently, both the connecting section and the end section are frustoconical and include an internal angle that is at least 110°, preferably at least 145°, and less than 180°. The sealing lip is consequently configured as a thickening and the overall appearance of the seal is mushroom-shaped.

Viewed in cross-section along the longitudinal axis, the sealing head preferably has an exclusively convex outer contour. The transitions between the various longitudinal sections, i.e. the connecting section, the sealing lip and the end section, are also in particular continuous and preferably rounded, so that there are no steps, but rather an overall smooth outer contour of the sealing head. The same expediently also applies to the transition from the sealing head to the sealing shaft. Especially in the case of a convex sealing lip, both the connecting section and the end section merge suitably into the sealing lip without kinks, edges or steps. Viewed in cross-section along the longitudinal axis, the entire sealing head thus has an overall convex outer contour.

In a suitable design, the sealing head, specifically in particular the end section, comprises a front surface into which a depression, also referred to as a recess, is introduced. The depression is configured such that the sealing head is expanded in radial direction in response to the application of pressure from the front. The depression therefore distributes the pressure onto the sealing head in such a way that a force acts on it from the inside out and toward the outside, so to speak.

The depression is suitably spherical, more specifically in the shape of a spherical segment, e.g. hemispherical. However, other shapes are possible and suitable as well. The depression expediently has a depth between 0.5 mm and 2 mm. In a suitable design, the depression is as deep as the end section is long. The depression is generally suitable for different shapes of the sealing head and specifically for the end section, including a sealing head that tapers or widens toward the front surface or is straight.

Between the pin and the seal of the sealing piston, there is an interface, which is particularly stressed due to the transition from one material to the other. Depending on the design, impurities that can lead to damage, especially to the seal, settle here over time.

In an expedient design, the sealing piston is constructed in two parts, in that the pin and the seal are connected to one another only loosely. In contrast to a plug-in coupling, for example, this results in the pin resting on the seal in a particularly advantageous manner, which reduces the penetration of impurities so that the sealing piston has a longer service life overall.

In a further expedient design, both the pin and the sealing head comprise an abutment surface via which the pin and the sealing head abut one another. The abutment surfaces thus form the abovementioned interface. The respective abutment surfaces are preferably continuous and flat.

The pin and the seal therefore rest flat against one another, and there is no plug-in coupling or the like, so that this too advantageously reduces the penetration of impurities.

The above-described three concepts relating to 1.) the long sealing lip, 2.) the direction of the taper of the end section and 3.) the depression in the front surface, are generally independent of one another and can be combined with one another as needed, so that further, not explicitly mentioned but nonetheless advantageous embodiments are possible.

Specifically, also independent of the feature that, measured in axial direction, the sealing lip has a sealing length that is greater than the difference between the sealing radius and the shaft radius, the above-described concept with the depression in the front surface is considered to be inventive on its own, because said frontal depression alone already achieves an improved sealing effect as well. In other words: the object is also achieved by a sealing piston that comprises a front surface into which a depression is introduced, which is designed such that the sealing head is expanded in radial direction in response to the application of pressure from the front. The applicant reserves the right to file a divisional application directed to such a sealing piston.

The object is in particular also achieved by a method for producing a sealing piston as described, whereby the sealing head is preferably produced by means of an injection molding process, i.e. as an injection-molded part. Advantageous designs, further developments and variants result analogously from the above explanations.

BRIEF DESCRIPTION OF THE DRAWINGS

Design examples of the invention are explained in more detail in the following using the figures. The figures show, in each case schematically.

DETAILED DESCRIPTION

Figure 1:
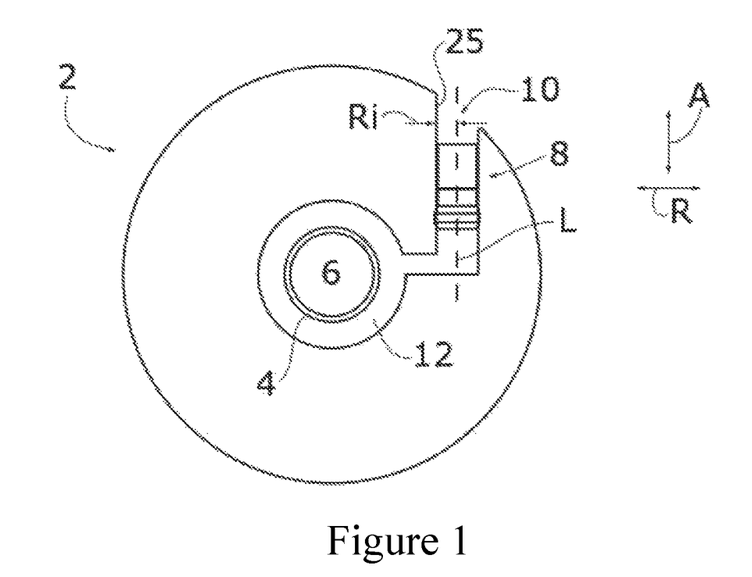
FIG. 1 an expansion chucking device with a sealing piston,
FIG. 2 a sealing piston,
FIG. 3 the sealing head of the sealing piston of FIG. 2,
FIG. 4 a variant of the sealing head of FIG. 3,
FIG. 5 a further variant of the sealing head of FIG. 3,
FIG. 6 a further variant of the sealing head of FIG. 3.
Figure 2:
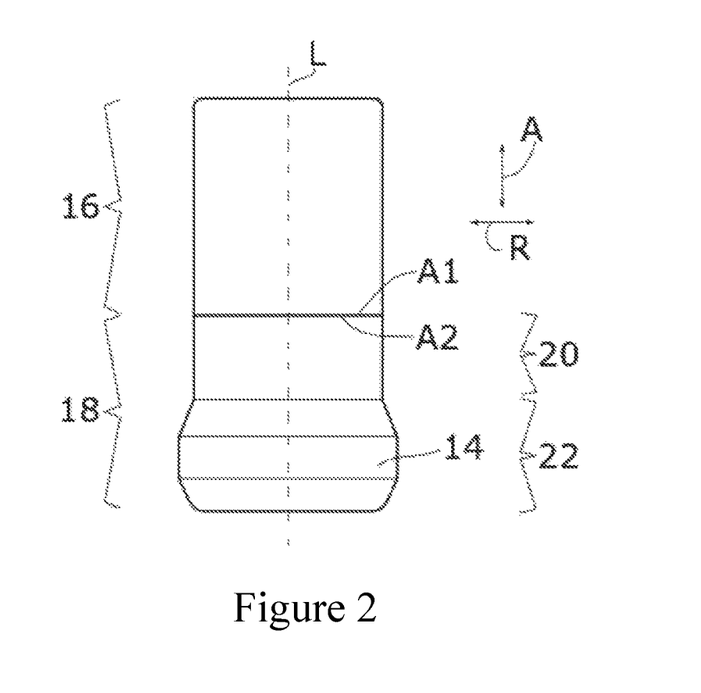

FIG. 1 is a highly schematized, sectional view of a hydraulic expansion chucking device 2, which in this case, without loss of generality, is an expansion chuck. The expansion chucking device 2 comprises a cylindrical expansion sleeve 4, which surrounds a cavity 6 into which a not more clearly depicted tool or workpiece can be inserted and in which said tool or workpiece can be clamped by actuating a sealing piston 8. A design example for the sealing piston 8 is shown in FIG. 2 in a lateral view. The expansion chucking device 2 comprises a bore 10, into which the sealing piston 8 is inserted. The sealing piston 8 seals a pressure chamber 12 of the expansion chucking device 2 from the environment. The sealing piston 8 can be moved in the bore 10, as a result of which, depending on the direction, the expansion chucking device 2 can be clamped and released. A fluid, which presses on a wall of the expansion sleeve 4, is disposed in the pressure chamber 12. By moving the sealing piston 8 into or out of the bore 10, pressure is correspondingly exerted on the fluid and the expansion sleeve 4, as well as on a tool or workpiece clamped therein or thereon.

FIG. 2 shows the sealing piston 8 of FIG. 1 in greater detail in a lateral view. The embodiment shown in FIG. 2 is characterized in that the sealing piston 8 in this case comprises a sealing lip 14 that is overall blunt and, when viewed in axial direction A, long. The sealing piston 8 comprises a pin 16 that extends in an axial direction A, and a seal 18 that directly adjoins the pin 16 and likewise extends in said axial direction A. Overall, the pin 16 and the seal 18 extend along a common longitudinal axis L and are arranged concentrically and one behind the other with respect to said longitudinal axis. The longitudinal axis L extends in axial direction A. Perpendicular to the axial direction A is a radial direction R. The pin 16 serves to actuate the sealing piston 8 from the outside. The seal 18, on the other hand, faces the inside of the expansion chucking device 2 and is in contact with the fluid in the pressure chamber 12.

The sealing piston 8 in FIGS. 1 and 2 is constructed in two parts, in that the pin 16 and the seal 18 are connected to one another only loosely. In contrast to a likewise suitable plug-in coupling, for example, this results in the pin 16 resting on the seal 18 in such a way that the penetration of impurities is reduced. The pin 16 and the seal 18 furthermore respectively comprise an abutment surface A1, A2, via which the pin 16 and the seal 18 abut one another. The abutment surfaces A1, A2 thus form an interface and in this case are both continuous and flat. A plug-in coupling or the like is not needed.

Figure 3:
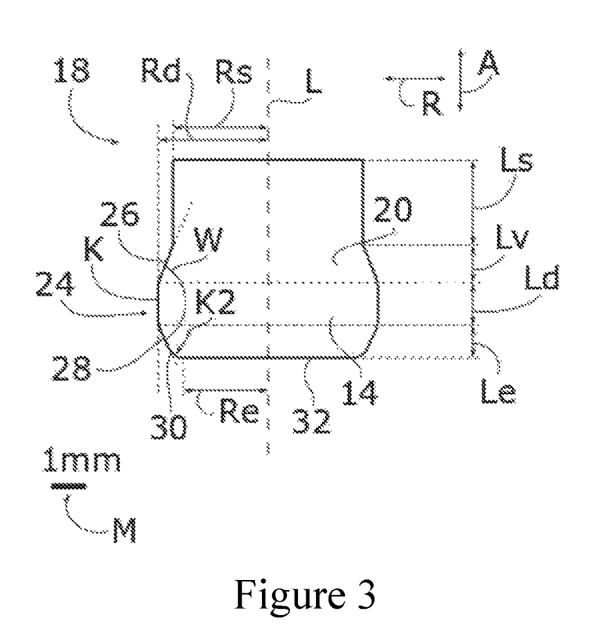
Figure 4:
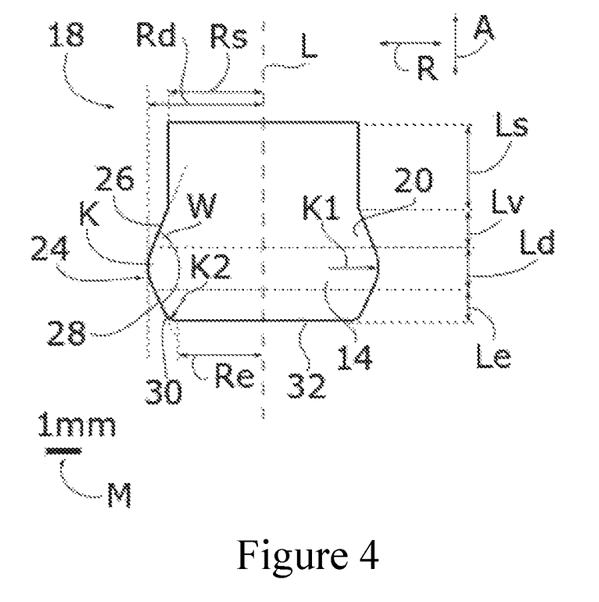

FIG. 3 shows the seal 18 of FIGS. 1 and 2 in detail and in a sectional view along the longitudinal axis L. Further preferred design examples of the seal 18 are shown in FIG. 4, 5, 6 respectively; again in a sectional view along the longitudinal axis L of the seal 18. The various designs of the sealing head 18 shown are explained in more detail in the following.

The seal 18 comprises a sealing shaft 20, which adjoins the pin 16 and has a shaft radius Rs measured in radial direction R. In this case, the shaft radius Rs corresponds to an inner radius Ri of the bore 10. The seal 18 further comprises a sealing head 22, which directly adjoins the sealing shaft 18. The sealing shaft 20 serves primarily to guide the seal 18 in the bore 10.

The sealing head 22 comprises a completely circumferential sealing lip 14, which has a sealing radius Rd that is greater than the shaft radius Rd. The sealing lip 14 forms a contact surface 24 in radial direction R for abutment and sealing against an inner wall 25 of the bore 10. For this purpose, the sealing radius Rd is larger than the inner radius Ri of the bore 10, i.e. it is manufactured oversized with respect to the bore, so that an interference fit is produced and the sealing lip 14 in the inserted state rests against the inner wall 25 of the bore 10 in a sealing manner. The sealing lip 14 is thus the part of the sealing head 22 which, when inserted, is in contact with the inner wall 25 of the bore 10 and compressed in radial direction, so that a sealing effect is achieved. In all of the design variants shown, the overall sealing piston 8 comprises only a single sealing lip 14. The contact surface 24 of the sealing lip 14 also essentially determines an outer contour K of the sealing head 22 as a whole.

In all of the design examples shown, the seal 18 is rotationally symmetric with respect to the longitudinal axis L. The pin 16 shown in FIGS. 1 and 2 is rotationally symmetric with respect to the longitudinal axis L as well.

Figure 5:
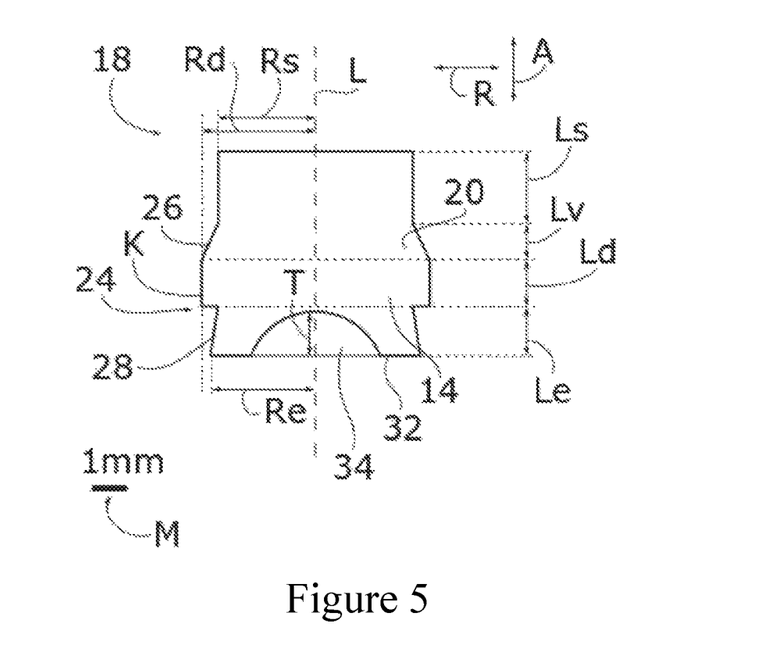
Figure 6:
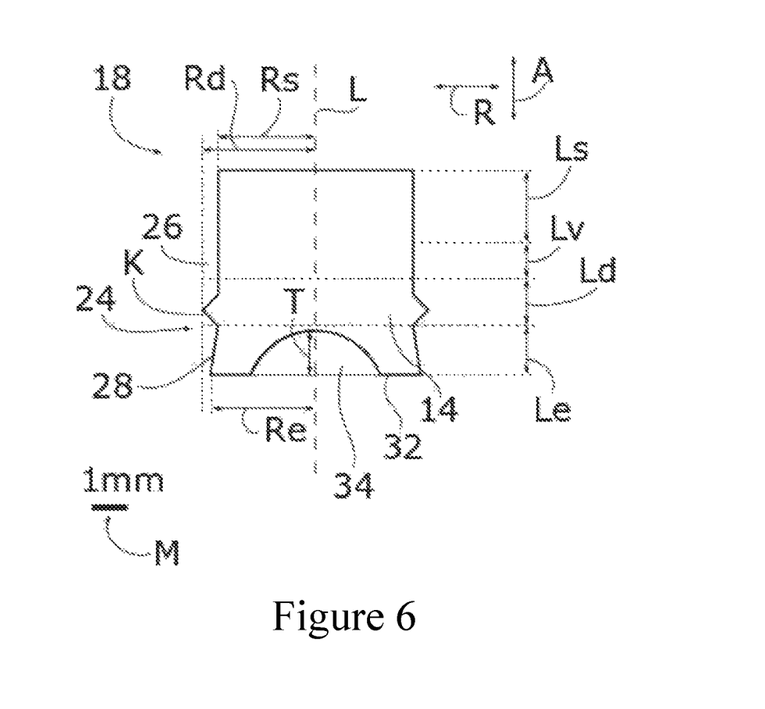

As can be seen in FIGS. 3 to 5, the sealing lip 14 in these design examples has a sealing length Ld measured in axial direction A, which is greater than the difference between the sealing radius Rd and the shaft radius Rs. Due to the specific sealing length Ld, the sealing lip 14 has an overall elongated, i.e. long, and also blunt shape, unlike a comparatively pointed sealing lip 14 as shown in FIG. 6, for example. The sealing lip 14 is thus particularly solid and produces a particularly large contact surface 24.

With reference to FIGS. 3 and 4, a concrete numerical example for dimensioning the seal 18 is provided in the following. The sealing lip 14 is at least 1 mm and at most 1.3 mm long; in FIGS. 3 and 4 it is specifically 1.3 mm. These lengths produce an overall long and blunt sealing lip 14. For a bore 10 having an inner radius Ri of 6 mm plus an upward tolerance, the pin 16, which is not shown in more detail in FIGS. 3 and 4, is undersized; e.g. has a diameter of 5.9 mm. The sealing shaft 20 has a shaft radius Rs of 3 mm and the sealing lip 14 has a sealing radius Rd of 3.3 mm. The seal 14 as a whole is approximately as long as it is wide, here overall 6 mm long, whereby the sealing shaft 20 has a shaft length Ls between 2 mm and 3 mm, here 2.6 mm, and the sealing head 22 is accordingly between 3 mm and 4 mm long, here 3.4 mm. The sealing lip 14 is formed approximately midway along the sealing head 22. For bores 10 having other inner radii Ri, the dimensions are correspondingly different. Further design variants can correspondingly be obtained by scaling the values given as examples or by carrying the ratios thereof over to other inner radii Ri.

A scale M for the determination of exemplary, suitable embodiments is provided in FIGS. 3 to 6, which does not, however, limit the scope of the invention to the dimensions and ratios shown. Rather, other suitable embodiments already result based on the purely schematic content of FIGS. 3 to 6 by varying the dimensions and their relationship to one another at least within the limit values provided above and in the following. If no limits are explicitly specified, suitable limits are obtained by applying a factor of ½ to 2 to the explicitly specified values.

The contact surface 24 generally extends around the longitudinal axis L in an annular manner. The sealing lip 14 is accordingly configured as a disc-shaped longitudinal section of the sealing head 22 and protrudes in radial direction R relative to the rest of the sealing head 22 and the sealing shaft 20. The sealing lip 14 is located in a plane perpendicular to the longitudinal axis L. A variety of designs are suitable for the sealing lip 14 and overall for the outer contour K, which is largely determined by the course of the contact surface 24, as long as the overall result is a correspondingly long and blunt shape as shown in FIG. 3, 4, 5.

In the design example of FIG. 3, the sealing lip 14 is cylindrical, so that the contact surface 24 is straight and extends in axial direction A, i.e. parallel to the longitudinal axis L and thus also parallel to the inner wall 25 of the bore 10. In the design example of FIG. 4, on the other hand, the sealing lip 14 is convex, i.e. spherical and curved outward. Overall, the sealing lip 14 in FIG. 4 is also free of edges. In a sectional view along the longitudinal axis L shown in FIG. 4, the sealing lip 14 has a corresponding radius of curvature K1, which in this case is at least 1 mm.

In the variants shown, the sealing head 14 comprises a number of further longitudinal sections. In principle, however, a not depicted design is also possible and suitable in which the sealing lip 14 alone forms the entire sealing head 22, so that the seal 18 consists solely of the sealing shaft 20 and the sealing lip 14 attached to it.

In all of the design examples shown, the sealing head 22 comprises a connecting section 26 that connects the sealing shaft 20 with the sealing lip 14, whereby the radius of the sealing head 22 continuously widens along the connecting section 26 from the shaft radius Rs on the sealing shaft 20 in the direction of the sealing lip 14 to the sealing radius Rd. In the present case, the respective connecting section 26 is frustoconical, but other shapes are possible and generally also suitable. Measured in axial direction A, the connecting section 26 has a length Lv that in this case corresponds to at least 75% and at most 150% of the sealing length Ld.

In all of the design examples shown here, the sealing head 22 additionally comprises an end section 28 which adjoins the sealing lip 24 on the side of the sealing lip 14 that is opposite to the sealing shaft 20. The end section 28 here is always frustoconical, and forms one end of the sealing head 22 and also of the sealing piston 8 as a whole. The radius of the sealing head 22 continuously decreases along the end section 28 from the sealing radius Rd to an end radius Re. In FIGS. 3 and 4, the end section 28 is oriented such that the radius tapers constantly in axial direction A and toward the front surface 32. The connecting section 26 and the end section 28 include an internal angle W that is at least 110° and less than 180°, so that the sealing lip 14 is configured overall as a thickening and the overall appearance of the seal 18 is mushroom-shaped. On its end, the end section 28 in FIGS. 3 and 4 further comprises a circumferential edge 30 which forms a transition to a front surface 32 of the sealing head 22 and, in this case, is rounded, with a radius of curvature K2 between 0.5 mm and 1 mm. The end radius Re is consequently accordingly reduced. Measured in axial direction A, the end section 28 has a length Le that in this case corresponds to at least 75% and at most 150% of the sealing length Ld of the sealing lip 14 and corresponds approximately to the length Lv of the connecting section 26.

Compared to the variants shown in FIGS. 3 and 4, the end section 28 in FIGS. 5 and 6 is not tapered toward the front surface 32, but is instead oriented conversely such that the radius widens from the sealing lip 14 toward the front surface 32. The abovementioned dimensions can be carried over. The end radius Re is then correspondingly larger than the radius directly underneath the sealing lip 14, which produces a corresponding step there, as can be seen in FIGS. 5 and 6, at which the end section 28 is set back inward relative to the sealing lip 14.

Viewed in cross-section along the longitudinal axis L, the sealing head 22 in FIGS. 3 and 4 has an exclusively convex outer contour K. The transitions between the various longitudinal sections, i.e. the connecting section 26, the sealing lip 14 and the end section 28, are continuous and additionally also rounded, so that overall there are no steps, but rather an overall smooth outer contour K of the sealing head 22. Especially in FIG. 4, both the connecting section 26 and the end section 28 merge into the sealing lip 14 without kinks, edges or steps.

In the design examples of FIGS. 5 and 6, the sealing head 22, especially the end section 28, comprises a depression 34 that is introduced into the front surface 32. The depression 34 is configured such that the sealing head 22 is expanded in radial direction R in response to the application of pressure from the front. The depression 34 therefore distributes the pressure onto the sealing head 22 in such a way that a force acts on it from the inside out and toward the outside, so to speak. The depression 34 in this case is configured in the shape of a spherical segment. However, other shapes are possible and generally suitable as well. The depression 34 has a depth T which is between 0.5 mm and 2 mm and here corresponds approximately to the length Le of the end section 28.

The three concepts described in connection with FIGS. 4 to 6 relating to 1.) the long sealing lip 14, 2.) the direction of the taper of the end section 28 and 3.) the depression 34 in the front surface 32, are generally independent of one another and can be combined with one another as needed, so that further, not explicitly shown embodiments are possible. In particular, as shown in FIG. 6, the concept with the depression 34 can even be combined with a pointed sealing lip 14, irrespective of the sealing length Ld.

The invention claimed is:

1. Sealing piston for use in a hydraulic expansion chucking device, comprising:
   a pin that extends in an axial direction (A); and
   a seal that adjoins the pin and extends in said axial direction (A),
   wherein the seal comprises a sealing shaft that adjoins the pin and has a shaft radius (Rs),
   wherein the seal further comprises a sealing head that adjoins the sealing shaft,
   wherein the sealing head comprises a circumferential sealing lip, which has a sealing radius (Rd) that is greater than the shaft radius (Rs),
   wherein the sealing lip forms a contact surface in radial direction (R) for abutment and sealing against an inner wall of a bore in the hydraulic expansion chucking device, wherein, measured in axial direction (A), the sealing lip has a sealing length (Ld) that is greater than the difference between the sealing radius (Rd) and the shaft radius (Rs), wherein the sealing head comprises an end section which adjoins the sealing lip on the side of the sealing lip that is opposite to the sealing shaft, wherein the end section comprises a circumferential edge which forms a transition to a front surface at one end of the sealing head, wherein the radius of the sealing head continuously decreases along the end section from the sealing radius (Rd) to an end radius (Re), wherein the sealing head comprises a connecting section that connects the sealing shaft to the sealing lip, and wherein both the connecting section and the end section are frustoconical and include an internal angle (W) that is at least 110° and less than 180°.

2. Sealing piston according to claim 1, wherein, measured in axial direction (A), the sealing lip is at least 1 mm long.

3. Sealing piston according to claim 1, wherein the sealing lip is cylindrical, so that the contact surface is straight and extends in the axial direction (A).

4. Sealing piston according to claim 1, wherein the sealing lip is convex.

5. Sealing piston according to claim 1, wherein the radius of the sealing head continuously widens along the connecting section from the shaft radius (Rs) to the sealing radius (Rd).

6. Sealing piston according to claim 1, wherein the sealing head has an exclusively convex outer contour (K).

7. Sealing piston according to claim 1, wherein said piston is constructed in two parts, in that the pin and the seal are connected to one another only loosely.

8. Sealing piston according to claim 1, wherein both the pin and the seal comprise an abutment surface (A1, A2) via which the pin and the seal abut one another, wherein each abutment surface (A1, A2) is continuous and flat.

9. Hydraulic expansion chucking device having a sealing piston according to claim 1.

* * * * *